May 16, 1961   E. J. McGINLEY   2,984,142
MUSIC CHART
Filed June 30, 1960   2 Sheets-Sheet 2

INVENTOR
EDWARD J. MC GINLEY
BY
Hugh S. Wertz
ATTORNEY

United States Patent Office 2,984,142
Patented May 16, 1961

2,984,142

MUSIC CHART

Edward J. McGinley, 76 Old Hollow Road,
Short Hills, N.J.

Filed June 30, 1960, Ser. No. 39,874

7 Claims. (Cl. 84—471)

This invention relates to music charts and more specifically to such charts which aid in the playing of keyboard instruments, e.g., pianos and/or organs.

A general object of this invention is to facilitate the playing of a musical instrument of the keyboard type by a beginner or by a person of limited musical knowledge or experience.

Numerous charts of various types have been proposed in the prior art for helping persons without formal musical training to enjoy at least elementary playing of a musical instrument. Attempts have been made in fact to indicate on various forms of charts and in various ways the relationship between words and musical notes of a song. In general, however, previous attempts have not been very successful. This is probably because the prior art charts or booklets have been either too complicated or the relationship between words, melody, and/or accompaniment has not been clearly, plainly and simply apparent to the user. An important object of this invention is to improve the notation system on a chart of that type to make it quickly usable to those who are relatively unlearned in music.

A further object of this invention is to make the playing of a keyboard instrument as entertaining as playing a game—one that can be enjoyed by one, two or a larger number of persons.

A further object of this invention is to utilize the words of a song to indicate the proper sequence in which certain keys of the instrument are to be played for the melody of the song.

The above and related objects are achieved in accordance with the invention by providing, by way of example, a chart having printed or otherwise represented thereon a portion of the keyboard of an instrument such as a piano or organ, the chart indicating both white and black keys, with the white key representations (frequently of exaggerated length) bearing the words of the song to be played as well as other information. Each word, or syllable of a multi-syllable word, of the song that is to be played on a white key is placed on the representation of the key on which it is to be played (usually by the right hand if a single person is playing); while each word or syllable corresponding to a black key is placed in a black background or in an appropriate box or other designation below the appropriate black key representation. Space permitting, the words or syllables are arranged in a horizontal line from left to right as long as the melody notes repeat or are progressively higher ("up" keyboard) but drop to the next lower line for a lower note ("down" keyboard) or when space limitations require starting a new line. Thus the words of the complete song are arranged in a series of vertically spaced horizontal lines, usually of uneven length, and frequently with staggered starting positions.

Associated with certain of the words or syllables are cue symbols or indicia, e.g. suitable numbers or characters which correspond to corresponding indicia placed on certain accompaniment notes to be played by the left hand if a single person is playing or by another player. These cue numbers or indicia also designate appropriate chords, preferably named at the left side of the chart, which can be played instead of or in addition to the accompaniment notes. The name of each accompaniment chord also defines its bass note, e.g. a single note in the bass section of the instrument which can be played instead of or in addition to the chord and/or with, or in proper timed relationship to, the melody note.

The chart is placed on the music rack or behind and above the keyboard in such a way that the appropriate key representations are aligned with the actual keys on the keyboard of the instrument.

If desired, more than one person can use the chart since as many as four types or groups of notes or chords can be played at one time, i.e. melody notes, accompaniment notes, chords, and bass notes. To facilitate the playing of the additional person or persons, the words and cue symbols or indicia are preferably repeated at the left of the chart above the keyboard representation. Since as many as four people can utilize the chart at one time, this "Play the Words" way of playing the keyboard instrument can be a family or group enterprise and even be used as a party game. For users who are familiar with the chords by their standard musical nomenclature, these may be so designated on the chart, if desired. For others, a simpler designation will often be preferred.

The invention will be more readily understood by referring to the following description taken in connection with the accompanying drawings forming a part thereof, in which.

Figure 1:
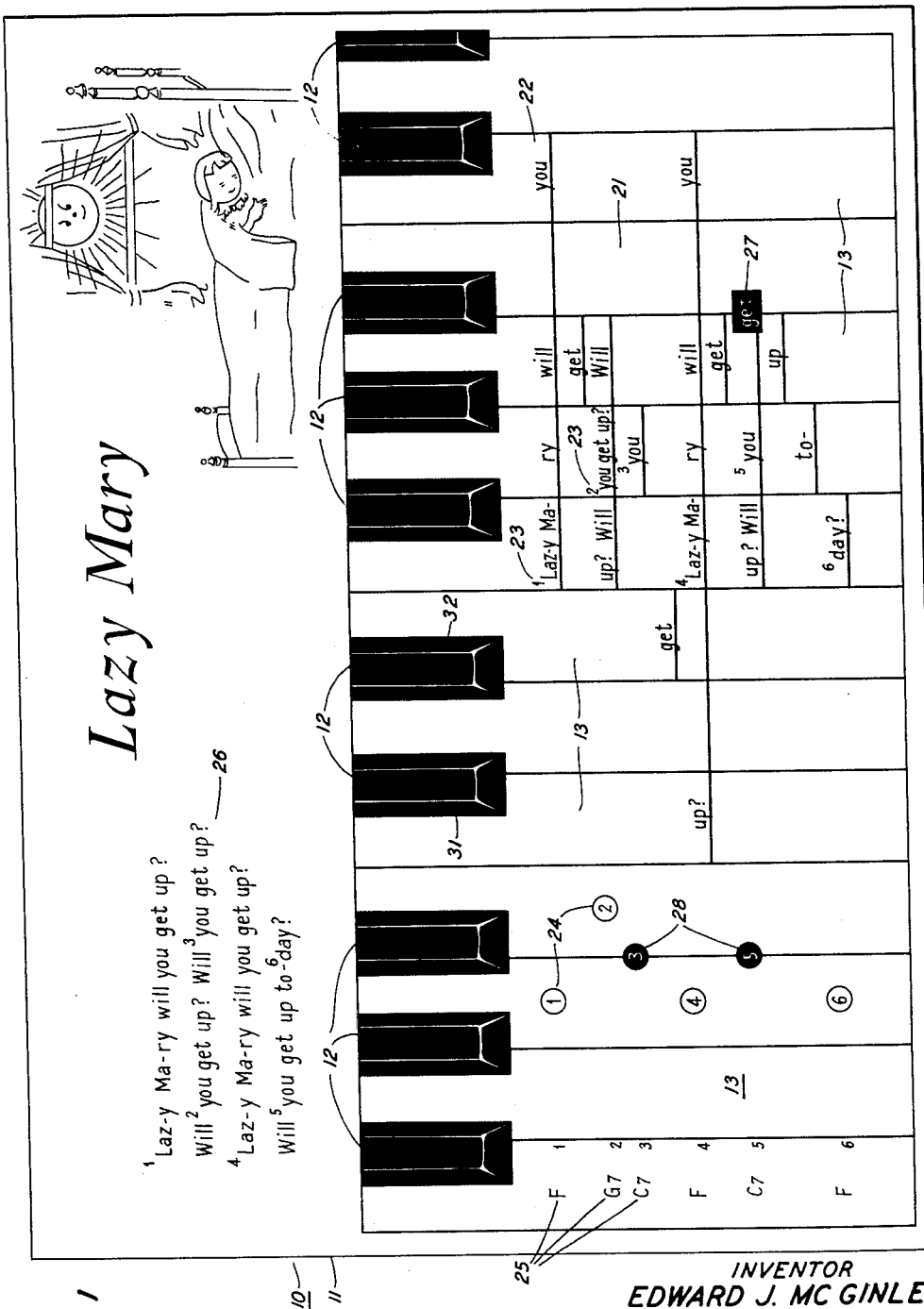
Fig. 1 shows the front face of a "Play the Words" chart in accordance with the invention.

Referring more specifically to the drawings, Fig. 1 shows, by way of example for purposes of illustration, a "Play the Words" chart 10 in accordance with the invention. The chart 10 is a device by means of which one or more persons, whether or not they know or can read music, will be able to play relatively familiar pieces on the piano or organ. As a matter of fact, as mentioned above, the chart can be used as a game for a family or other group.

The chart 10 preferably comprises a card or sheet 11 on which are printed or otherwise represented a number of black and white keys of a keyboard for a keyboard instrument, e.g. piano or organ. By way of an example, between one and two octaves of keys are represented. The black keys 12 are arranged in groups of two and three, as on the keyboard of a piano or organ, and each is preferably of approximately the same width as a black key of a standard instrument. The white keys 13 are also of substantially the same width as standard white keys of a piano but may be of exaggerated length to provide space to carry the words and other information of the song to be played.

Figure 2:
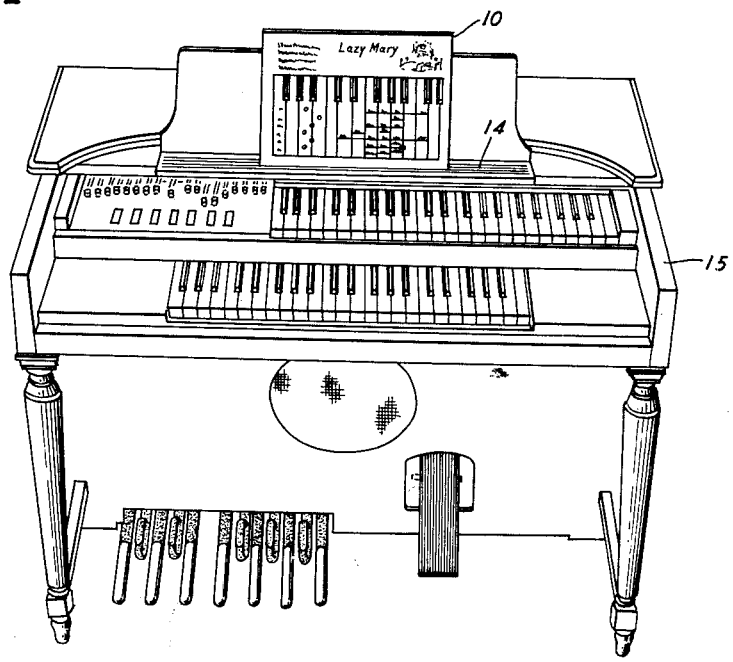
Fig. 2 shows the chart of Fig. 1 in position on the music rack of a two-manual or spinet type organ.
Figure 3:
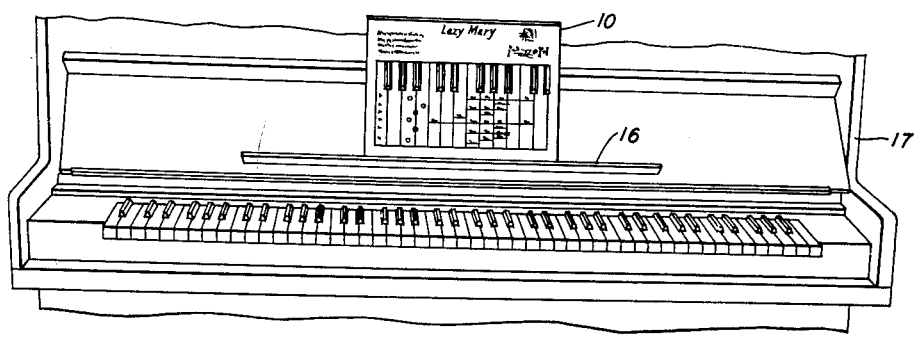
Fig. 3 shows the chart of Fig. 1 in position on the music rack of a piano.
Figure 4:
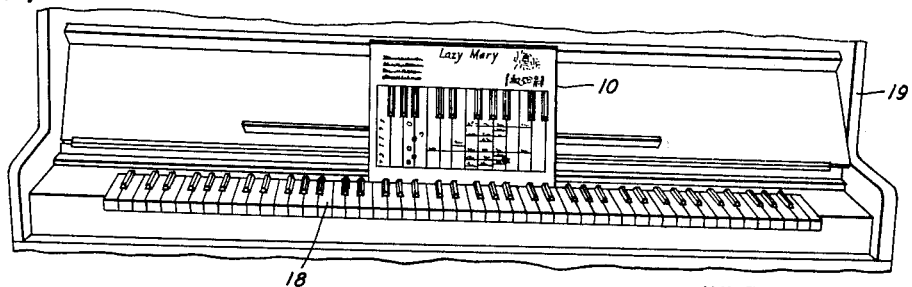
Fig. 4 shows the chart of Fig. 1 positioned at the back of the keyboard of a piano.

The chart 10 is adapted to be placed either on a music rack 14 of an organ 15 as in Fig. 2, or on a rack 16 of a piano 17 as in Fig. 3, or behind the keyboard 18 of a piano 19 as in Fig. 4. In each case, the two black keys 31 and 32 of the chart 10 preferably are lined up vertically with the two black keys in the approximate center of the instrument (not necessarily the center of the keyboard), which two keys are generally to the immediate right of "middle C" on the keyboard. The chart 10 obviously can be used with any piano, portable or fixed, or with any organ, portable or fixed, chord type or other, or with a harpsichord, etc.

Reference will again be made to Fig. 1 for details of the chart 10. Words 21, or syllables of a multi-syllable word, of the composition (song) to be played are printed on the appropriate white keys 13, preferably below the lower limits of the black keys 12. The multi-syllable words are preferably divided into syllables and each syllable is placed on the white key corresponding to the musical note or pitch appropriate to the syllable. Where space permits, the syllables are arranged consecutively from left to right in horizontal lines 22, each line terminating when a lower note is to be played, or sooner if required by space limitations. The next note starts another line under the preceding one and the line extends to the right until space limits require a new line or until another note lower than the immediately preceding one is to be played. Assuming for the moment that the "melody notes" all fall on white keys, the words or syllables 21 are placed on the keys 13 corresponding to such "melody notes," which are the instrumental keys normally played with the right hand (assuming one player only). When black keys are required for melody notes, they are indicated in a distinctly different representation to be explained below.

The chart 10 also contains much information to indicate the proper accompaniment notes to be played. Placed in suitable location with respect to certain words or syllables of the song are cue numbers or other indicia or symbols 23. Corresponding uniquely marked numbers 24 are placed on certain keys 13 to indicate keys separate from melody notes, e.g. for accompaniment notes, to be played at the same time as, or in proper timed relation to, the keys containing cue numbers 23 on the chart. The markings for such notes must be clearly different from melody notes; for example, they are shown encircled in Fig. 1. If desired, they may be shown in different color or printed in a distinctive type face. If there is but a single player, these accompaniment notes will ordinarily be played with the left hand.

Also placed on the chart 10 are a number of chord designations 25, each with a number or other indicator corresponding to the cue number or other symbol 23. If the instrument being played is a chord organ, the chord designated on the chart 10 is played (at the same time as, or in proper relation with, the key represented by the corresponding cue number 23) by pressing the appropriate chord button. If the instrument being played is a piano or "non-chord" organ, the proper keys corresponding to the designated chord would be played by one who knows the chords. Beginners might omit them or play only single notes, depending upon their choice or ability. For example, instead of, or in addition to (if there is more than one player) the designated chord, the bass note bearing the same name as the chord can be played.

Thus, it will be apparent that there are preferably at least four types of information relating to notes or groups of notes shown by the chart 10. These are: (1) the words 21 (the melody notes), (2) the cue symbols 23 with the corresponding numbered circles or other unique designations 24 (the accompaniment notes), (3) the chord names or equivalent accompaniment indicators 25 (accompaniment chords), and (4) the chord root note which is included as part of a chord indicator 25 defining a single key in the bass section of the instrument.

Optionally, if more than two of the types of information just listed are to be utilized at one time, more than one player may participate. Actually, the chart 10 can be used by one, two, three or four players at the same time. For example, if all types of information are used simultaneously, one player can play the melody notes (by "playing the words" 21), a second can play the discrete accompaniment notes 24, a third can play bass notes and/or chords from the capital letter chord names 25 shown at the left of the chart 10, and a fourth can duplicate the treble notes (corresponding to the words 21) in a higher octave.

It was noted above that words ordinarily will be printed or recorded on the white key representations of the chart and the assumption was made that the melody notes would be played on white keys. In such case, they require no special designation. However, when a word or syllable requires a black key to be played, special notations are used to indicate the use of a black key instead of a white one. The word "get," represented by the reference character 27, is shown as requiring a black key (B-flat or A-sharp as shown) for its correct pitch, and this is indicated with a contrasting background, i.e. white on black to call prominent attention to the fact that a black key must be played. Moreover, the word is printed across the line between two white keys. Corresponding accompaniment notes requiring black keys are indicated by the reference character 28. Instead of, or in addition to a contrasting background (of any color) the note may be designated in a color other than that used for the white key indicia, or by any other appropriate shape or form.

To make it easier for the second or other player to tell the timing of the accompaniment notes or chords, the words may be repeated (in stanza form 26) in the chart 10 above the upper limits of the black keys 12. This has the additional advantage of showing the lyrics in conventional verse form, which helps tie the composition together.

Obviously, various other changes can be made in the embodiments described above without departing from the spirit of the invention, as indicated in the claims.

What is claimed is:

1. A music chart for use on a keyboard instrument such as a piano, organ or the like to designate the keys to be struck in playing a composition, comprising a chart having representations thereon which correspond to a row of black and white keys on said instrument, the width of each black or white key representation of the chart being substantially the same as the width of a corresponding key on the instrument, and having the words of said composition on said white key representations in the portions thereof below the lower limits of said black key representations, all syllables of said words that are to be played on any given white key of the instrument appearing on the representation of that key in one manner, and all syllables of said words that are to be played on any given black key of the instrument appearing below said black key representation in a different manner, whereby the syllables that are to be played on black keys are readily distinguishable from those that are to be played on white keys.

2. The combination of elements as in claim 1 in which each syllable that is to be played on a black key appears in a box crossing the line dividing the two white keys below the said black key.

3. The combination of elements as in claim 1 in which each syllable that is to be played on a black key appears in white on a background of a contrasting shade.

4. The combination of elements as in claim 1 in which the words of said composition are arranged in a series of vertically-displaced horizontal lines.

5. The combination of elements as in claim 1 in further combination with cue symbols placed adjacent certain of the syllables of said words and which are repeated on 6. The combination of elements as in claim 1 in further combination with cue symbols placed adjacent certain of the syllables of said words and which are repeated opposite chord means to indicate chords to be played as an accompaniment.

7. The combination of elements as in claim 6 in which said chart also has above the upper limits of said black key representations the words of the melody of said composition with corresponding cue symbols.

References Cited in the file of this patent

UNITED STATES PATENTS

| | | |
|---|---|---|
| 1,201,769 | Siegel | Oct. 17, 1916 |
| 1,558,257 | Fisher et al. | Oct. 20, 1925 |
| 1,576,004 | Rosenberg | Mar. 9, 1926 |
| 2,188,098 | Bostelmann | Jan. 23, 1940 |
| 2,487,021 | Green | Nov. 1, 1949 |